United States Patent
Tong et al.

(10) Patent No.: US 10,142,051 B2
(45) Date of Patent: Nov. 27, 2018

(54) TRANSMISSION DEVICE AND RECEPTION DEVICE

(71) Applicant: KYOCERA CORPORATION, Kyoto (JP)

(72) Inventors: Fangwei Tong, Machida (JP); Masato Fujishiro, Yokohama (JP); Chiharu Yamazaki, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/988,195

(22) Filed: May 24, 2018

(65) Prior Publication Data
US 2018/0270012 A1  Sep. 20, 2018

Related U.S. Application Data

(63) Continuation of application No. PCT/JP2016/084779, filed on Nov. 24, 2016.

(30) Foreign Application Priority Data

Nov. 26, 2015 (JP) ................................. 2015-230553

(51) Int. Cl.
*H04L 1/00* (2006.01)
*H04L 5/02* (2006.01)
(Continued)

(52) U.S. Cl.
CPC ......... *H04L 1/0026* (2013.01); *H04B 7/0626* (2013.01); *H04L 1/00* (2013.01);
(Continued)

(58) Field of Classification Search
CPC ....... H04L 1/0026; H04L 1/00; H04L 1/0003; H04L 1/0045; H04L 5/02; H04L 1/0063; H04L 27/00; H04L 27/38; H04B 7/0626
See application file for complete search history.

(56) References Cited

U.S. PATENT DOCUMENTS

| | | | |
|---|---|---|---|
| 5,321,721 A | 6/1994 | Yamaura et al. | |
| 6,490,243 B1 * | 12/2002 | Tanaka | H03M 13/00 370/216 |

(Continued)

FOREIGN PATENT DOCUMENTS

| | | |
|---|---|---|
| JP | H06-014006 A | 1/1994 |
| JP | 2004-128987 A | 4/2004 |

(Continued)

OTHER PUBLICATIONS

Barmada et al.; Prioritized Transmission of Data Partitioned H.264 Video With Hierarchical QAM; IEEE Signal Processing Letters; vol. 12. No. 8; Aug. 2005; pp. 577-580.

(Continued)

*Primary Examiner* — Syed Haider
(74) *Attorney, Agent, or Firm* — Studebaker & Brackett PC

(57) ABSTRACT

A transmission device (100) transmits transmission information to a reception device (200) via a radio channel. The transmission device (100) includes: a grouping unit (110) configured to divide the transmission information into a plurality of information groups; an error detection code adding unit (120) configured to add an error detection code to each of the plurality of information groups; and a transmission processing unit (140) configured to perform a process of transmitting the plurality of information groups to the reception device (200). The transmission processing unit (140) performs, for each information group included in the plurality of information groups, a transmission process by using a method having different error tolerance on the radio channel.

13 Claims, 10 Drawing Sheets

(51) Int. Cl.
*H04L 27/00* (2006.01)
*H04B 7/06* (2006.01)
*H04L 27/38* (2006.01)

(52) U.S. Cl.
CPC .......... *H04L 1/0003* (2013.01); *H04L 1/0045* (2013.01); *H04L 1/0063* (2013.01); *H04L 5/02* (2013.01); *H04L 27/00* (2013.01); *H04L 27/38* (2013.01)

(56) References Cited

U.S. PATENT DOCUMENTS

| | | | |
|---|---|---|---|
| 2004/0066844 A1 | 4/2004 | Moon et al. | |
| 2004/0128609 A1* | 7/2004 | Kurobe | H04L 1/0083 714/776 |
| 2006/0234628 A1* | 10/2006 | Horiguchi | H04L 1/0006 455/39 |
| 2008/0192705 A1* | 8/2008 | Suzuki | H04L 1/0061 370/335 |
| 2008/0279168 A1 | 11/2008 | Kalhan et al. | |
| 2009/0213955 A1* | 8/2009 | Higuchi | H04B 7/0669 375/267 |
| 2011/0173517 A1* | 7/2011 | Kim | H04B 7/15592 714/776 |
| 2016/0020929 A1 | 1/2016 | Yamazaki et al. | |

FOREIGN PATENT DOCUMENTS

| | | |
|---|---|---|
| JP | 2009-033340 A | 2/2009 |
| JP | 2010-527545 A | 8/2010 |
| WO | 2014/156956 A1 | 10/2014 |

OTHER PUBLICATIONS

Hoeher; Unequal Error Protection for Digital Mobile DS-CDMA Radio Systems; IEEE; 1994; pp. 1236-1241.

* cited by examiner

TRANSMISSION DEVICE AND RECEPTION DEVICE

CROSS-REFERENCE TO RELATED APPLICATION

The present application is a continuation based on PCT Application No. PCT/JP2016/084779 filed on Nov. 24, 2016, which claims the benefit of Japanese Patent Application No. 2015-230553 (filed on Nov. 26, 2015). The content of which is incorporated by reference herein in their entirety

FIELD

The present invention relates to a transmission device and a reception device, and particularly relates to a transmission device and a reception device in a radio transmission system.

BACKGROUND

In recent years, an analog transmission scheme and a digital transmission scheme have been known as a transmission scheme in a radio transmission system (for example, see Patent Document 1).

The analog transmission scheme can be automatically adapted to the state of a radio channel (radio propagation path), and thus, information amount according to a channel state can be transmitted. In other words, in the analog transmission scheme, the transmission performance automatically improves as the state of the radio channel improves. However, in the analog transmission scheme, it is difficult to secure transmission of information.

On the other hand, in the digital transmission scheme, an optimal amount of information can be transmitted and secure transmission can be performed, by switching between transmission methods (a modulation scheme and an error correction coding scheme). However, in the digital transmission scheme, if a transmission method not suitable for the channel state is used, there is a problem that the channel capacity cannot be fully utilized or information cannot be transmitted at all. Further, in the digital transmission scheme, there is a problem that a processing load and an overhead are increased by having complex control such as measuring the channel state and feeding the measurement result back.

PRIOR ART DOCUMENT

Patent Document

Patent Document 1: International Publication No. 2014/156956

SUMMARY

A transmission device according to a first aspect transmits transmission information to a reception device via a communication channel. The transmission device comprises a grouping unit configured to divide the transmission information into a plurality of information groups; an error detection code adding unit configured to add an error detection code to the plurality of information groups; and a transmission processing unit configured to perform a process of transmitting the plurality of information groups to the reception device. The transmission processing unit performs, for each information group included in the plurality of information groups, a transmission process by using methods having different error tolerance on the communication channel.

A reception device according to a second aspect receives transmission information from a transmission device via a communication channel. The reception device comprises a reception processing unit configured to perform a reception process of a plurality of information groups transmitted from the transmission information by using methods having different error tolerance on the communication channel; an error detection unit configured to use an error detection code included in the plurality of information groups to determine a correctly received information group among the plurality of information groups; and a group composing unit configured to perform a composing process of the correctly received information group.

DESCRIPTION OF THE EMBODIMENT

Embodiment

Figure 1:
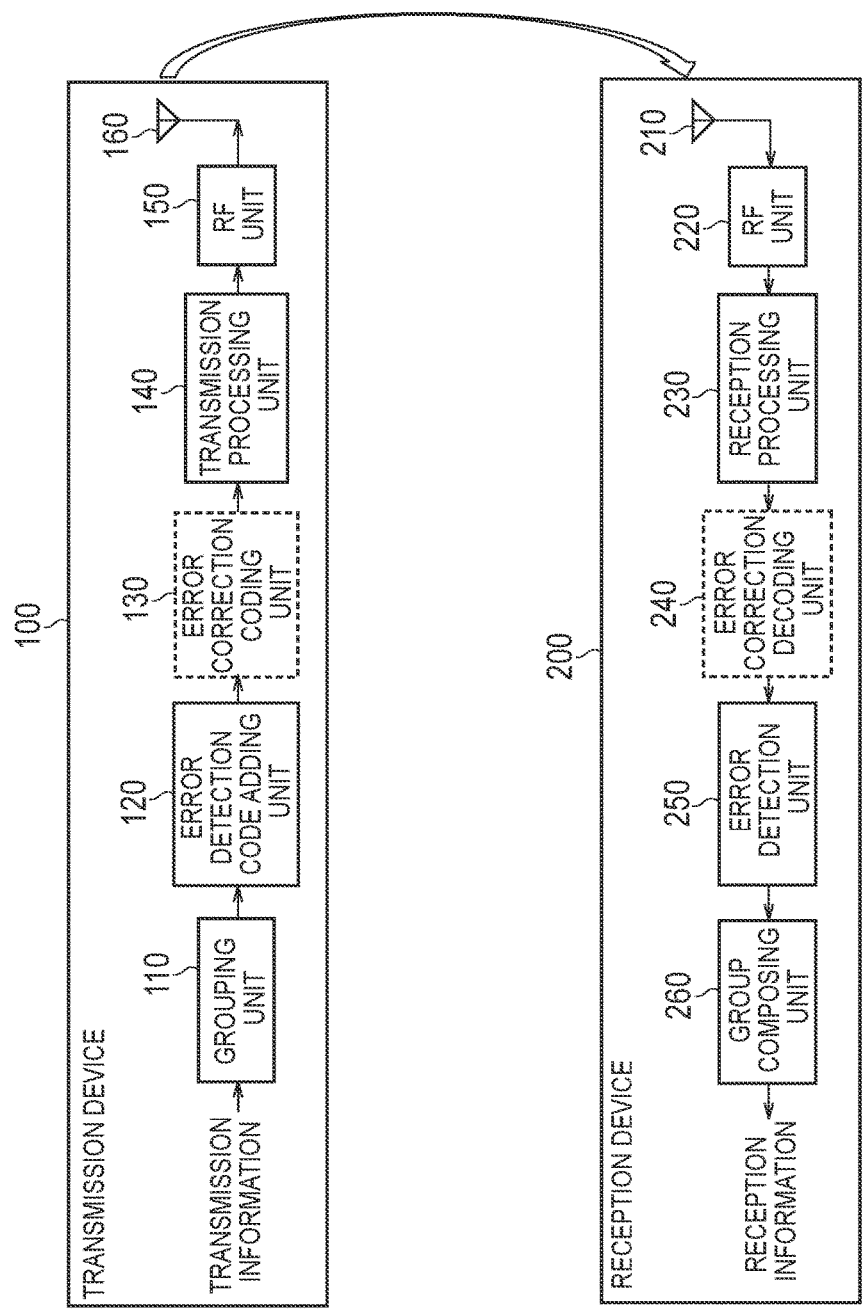
FIG. 1 is a diagram illustrating a configuration of a radio transmission system according to an embodiment.

Hereinafter, an embodiment will be described. FIG. 1 is a diagram illustrating a configuration of a radio transmission system 1 according to the embodiment. In the embodiment, an example in which the radio transmission system 1 is a mobile communication system will be mainly described. However, the radio transmission system 1 may be a system different from the mobile communication system, such as a broadcast system, a wireless LAN system, or the like.

As illustrated in FIG. 1, the radio transmission system 1 includes a transmission device 100 configured to transmit transmission information to a reception device 200 via a radio channel, and the reception device 200 configured to receive the transmission information from the transmission device 100 via the radio channel. The transmission device 100 is a radio terminal of the mobile communication system, and the reception device 200 is a base station of the mobile communication system. Alternatively, the transmission device 100 may be a base station of the mobile communication system, and the reception device 200 may be a radio terminal of the mobile communication system. The transmission information may be Channel State Information (CSI). The transmission information may be a control signal. The transmission information may be user data. It is noted that the radio transmission system 1 according to the embodiment performs digital transmission having a similar characteristic to the analog transmission, and thus there is a possibility that partial loss of information may occur at a reception side. Thus, the transmission information is preferably the one which can tolerate the partial loss of information.

First, a configuration of the transmission device 100 will be described. The transmission device 100 includes a grouping unit 110, an error detection code adding unit 120, an error correction coding unit 130, a transmission processing unit 140, a Radio Frequency (RF) unit 150, and an antenna 160. It is noted that the error correction coding unit 130 is not an essential configuration and it is not necessary for the transmission device 100 to include the error correction coding unit 130.

The grouping unit 110 divides the transmission information into a plurality of information groups in accordance with a predetermined rule. The plurality of information groups may include a basic information group and a supplementary information group. The basic information group is an information group formed of bits having high importance. The supplementary information group is an information group formed of bits having lower importance compared to the basic information group. The supplementary information group is utilized in combination with the basic information group in the reception device 200. The supplementary information group may be further subdivided into a plurality of groups. It is noted that the larger the number of information groups, the more likely to achieve a performance close to a channel adaptation performance of the analog transmission scheme. A description will be made while focusing on an example where the number of information groups is three, below. The number of information groups may be two. Further, the number of information groups may be four or more. If the number of information groups is three, an information group 1 corresponds to the basic information group, an information group 2 corresponds to the supplementary information group, and an information group 3 corresponds to a detailed supplementary information group. The detailed supplementary information group is an information group formed of information more detailed than that of the supplementary information group.

The error detection code adding unit 120 adds an error detection code to each of a plurality of information groups (information groups 1 to 3). Specifically, the error detection code adding unit 120 generates an error detection code from bits included in the information group, and includes the generated error detection code into the information group. The error detection code is used to determine whether or not each information group is correctly received in the reception device 200. The error detection code may be a parity check sum or may be a Cyclic Redundancy Check (CRC) that is an error detection code having higher performance.

The error correction coding unit 130 performs an error correction coding to each of the plurality of information groups (information groups 1 to 3) to which the error detection codes are added. Although the error correction coding contributes to the improvement of the communication reliability, the error correction coding is not essential and may be omitted. Further, when the error correction coding is performed to each of the information groups, different error tolerance on a radio channel may be provided to each information group by using an error correction code having a different error correction performance or a different code rate, in combination with the process of the below-described transmission processing unit 140.

The transmission processing unit 140 performs a process of transmitting the plurality of information groups (information groups 1 to 3) to the reception device 200. The transmission processing unit 140 performs, for each information group, a transmission process by using methods having different error tolerance on the radio channel. Hereinafter, the error tolerance on the radio channel is referred to as "channel tolerance". The transmission processing unit 140 performs a process of transmitting the plurality of information groups to the reception device 200 irrespective of a measurement result of the channel state of the radio channel. That is, the transmission processing unit 140 transmits all information to be transmitted, without considering the actual channel state. The transmission processing unit 140 provides channel tolerance to each information group, based on a channel state assumed over system design. For example, to perform secure transmission, the transmission processing unit 140 provides, to the information group 1, channel tolerance that matches with the worst channel state to be assumed (the worst SINR and the like). The transmission processing unit 140 provides, to the information group 3, channel tolerance that matches with the best channel state assumed over the system design (the best SINR and the like). The transmission processing unit 140 provides, to the information group 2, channel tolerance that matches with an intermediate channel state between the worst channel state and the best channel state. In this manner, the transmission processing unit 140 performs a process of transmitting the basic information group (information group 1) by using a transmission method having higher channel tolerance compared to a transmission method applied to the supplementary information group (information groups 2 and 3). Details of the transmission processing unit 140 will be described in Examples 1 to 3 described later. Examples 1 and 2 are Examples in which the plurality of information groups are transmitted and received by using an identical time-frequency resource. Example 3 is an Example in which the plurality of information groups are transmitted and received by using different time-frequency resources.

The RF unit 150 converts a baseband transmission signal including the plurality of information groups into an RF signal. The RF unit 150 transmits the RF signal from the antenna 160.

The antenna 160 is used for transmitting an RF signal.

Next, a configuration of the reception device 200 will be described. The reception device 200 includes an antenna 210, an RF unit 220, a reception processing unit 230, an error correction decoding unit 240, an error detection unit 250, and a group composing unit 260. It is noted that if the error correction coding unit 130 is not provided in the transmission device 100, it is not necessary for the reception device 200 to include the error correction decoding unit 240.

The antenna 210 receives an RF signal.

The RF unit 220 converts the RF signal received by the antenna 210 into a baseband reception signal. The reception signal includes a plurality of information groups (information groups 1 to 3).

The reception processing unit 230 performs a reception process (demodulation, decoding, and the like) of the reception signal including the plurality of information groups (information groups 1 to 3). The reception processing unit 230 applies a reception method different depending on each of the information groups and outputs the plurality of information groups. If the plurality of information groups are multiplexed on an identical time-frequency resource, the reception processing unit 230 performs de-multiplexing. Details of the reception processing unit 230 will be described in Examples 1 to 3 described later.

The error correction decoding unit 240 performs error correction decoding on each of the plurality of information groups (information groups 1 to 3). Although the error correction decoding contributes to the improvement of the communication reliability, if the error correction coding unit 130 is not provided in the transmission device 100, the error correction decoding may be omitted.

The error detection unit 250 uses an error detection code included in each of the plurality of information groups (information groups 1 to 3) to detect an error of the information group. The error detection unit 250 determines a correctly received information group among the plurality of information groups. The error detection unit 250 outputs the correctly received information group and discards an information group that has not been correctly received. It is noted that the plurality of information groups are transmitted by using methods having different channel tolerance, and thus, the better the channel state is, the more information groups can be correctly received (that is, channel adaptation transmission and reception).

If the correctly received information group is two or more, the group composing unit 260 performs a reverse process (composing process) of the grouping, to restore to the original transmission information. If some of the information groups are not correctly received, the group composing unit 260 may pad some of the information groups among the transmission information with zeros (so called a padding process). The group composing unit 260 outputs reception information obtained by the composing process.

Figure 2:
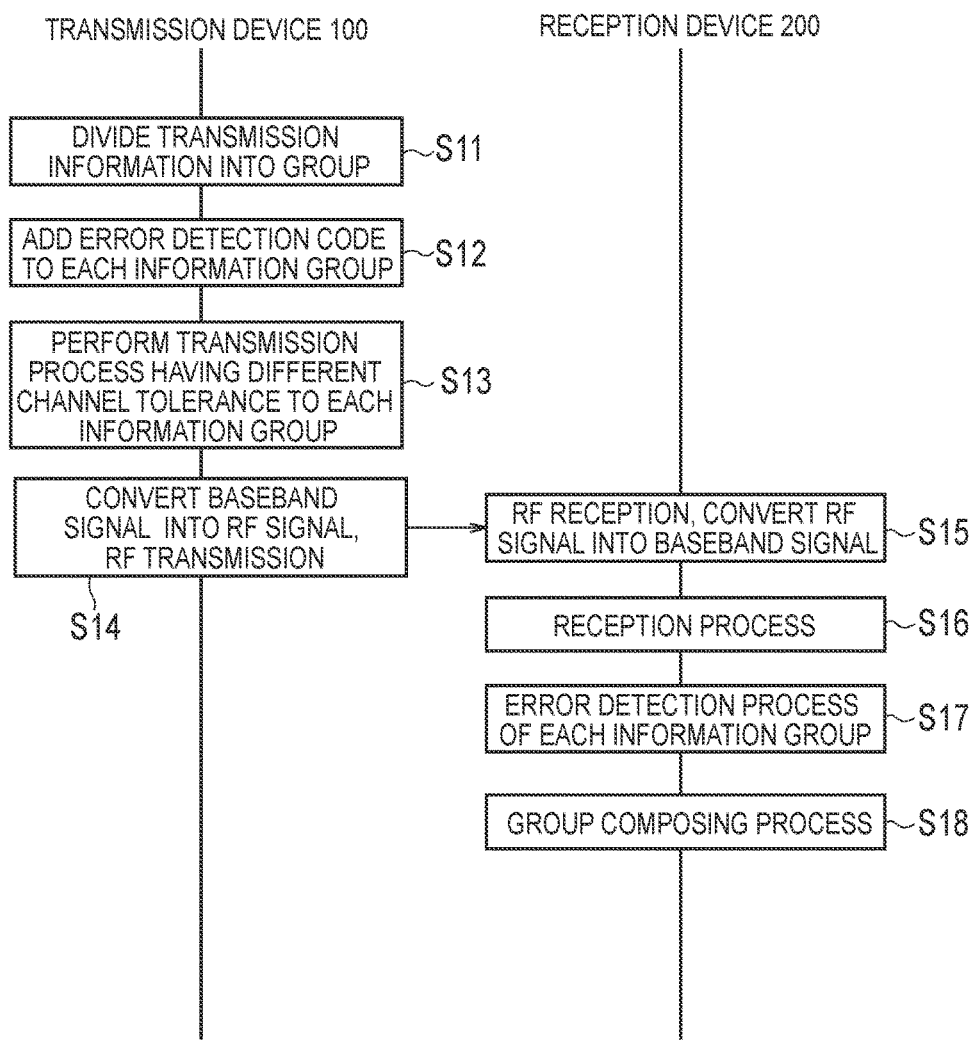
FIG. 2 is a diagram illustrating an operation of the radio transmission system according to the embodiment.

FIG. 2 is a diagram illustrating an operation of the radio transmission system 1.

As illustrated in FIG. 2, the transmission device 100 divides transmission information into a plurality of information groups (step S11). The transmission device 100 adds an error detection code to each information group (step S12). Then, the transmission device 100 performs a transmission process having different channel tolerance to each information group (step S13). The transmission device 100 converts a baseband transmission signal into an RF signal. The transmission device 100 transmits the RF signal (step S14).

The reception device 200 converts the received RF signal into a baseband reception signal (step S15). The reception device 200 performs a reception process of the reception signal. The reception device 200 obtains the plurality of information groups (step S16). Then, the reception device 200 uses the error detection code to perform an error detection process for each information group (step S17). The reception device 200 performs a composing process of a correctly received information group (step S18).

In this manner, the transmission device 100 performs transmission anyway while ignoring the actual channel state, and the reception device 200 takes out and receives as much information as possible. According to the radio transmission system 1, it is possible to achieve the benefit of the analog transmission scheme even when the digital transmission scheme is used. Specifically, the plurality of information groups are transmitted and received by using methods having different channel tolerance, and thus, it is possible to adaptively transmit information of an amount according to the channel state without requiring complex controls such as measurement and feedback of the channel state. Therefore, it is possible to achieve the benefit of the analog transmission scheme. Further, according to the radio transmission system 1, reliable information can be received for the correctly received information group. Further, using the digital transmission scheme facilitates implementation as compared with the analog transmission scheme. Therefore, it is possible to achieve the benefit of the digital transmission scheme.

EXAMPLE

Hereinafter, Examples 1 to 3 will be described. In Examples 1 to 3, description will be made focusing on details of the above-described transmission processing unit 140 and reception processing unit 230.

Example 1

In the transmission device 100, the grouping unit 110 divides transmission information into a plurality of information groups. Here, an example is assumed where the following matrix is transmitted from the transmission device 100 to the reception device 200.

$$\begin{bmatrix} h_{11} & h_{12} & \cdots & h_{1N} \\ h_{21} & h_{22} & \cdots & h_{2N} \\ \vdots & \vdots & \ddots & \vdots \\ h_{N1} & h_{N2} & \cdots & h_{NN} \end{bmatrix} \qquad [\text{Math. 1}]$$

Each of $h_{11}$ to $h_{NN}$ is presumed to be digital information (binary information) having a length of 14 bits. Each of $h_{11}$ to $h_{NN}$ corresponds to the transmission information. It is presumed that these 14 bits are arranged from left to right in the order from a Most Significant Bit (MSB) to a Least Significant Bit (LSB). However, the transmission information is not limited to 14 bits, and may be 12 bits, 16 bits, bits having more than 16 bits, or the like. Hereinafter, an example will be described where an element $h_{11}$ within the matrix is transmitted as the transmission information.

The grouping unit 110 divides the 14 bits of $h_{11}$ into three information groups. For example, as described below, for $h_{11}$, the grouping unit 110 divides three bits on the MSB side into information group 1, divides five bits after the three bits into information group 2, and divides six bits on the LSB side into information group 3.

$$h_{11} = (a1, a2, a3, b1, b2, b3, b4, b5, c1, c2, c3, c4, c5, c6)$$

Here, a1 to a3 indicate the information group 1 (basic information group), b1 to b5 indicate the information group 2 (supplementary information group), and c1 to c6 indicate the information group 3 (detailed supplementary information group). It is noted that the grouping indicated here is only an example, and other grouping method may be adopted. For example, it is possible to group the three bits on the MSB side of all elements ($h_{11}$ to $h_{NN}$) of the matrix into one information group.

In the transmission device 100, the error detection code adding unit 120 adds an error detection code to each of the information groups 1 to 3. The error correction coding unit 130 performs error correction coding to each of the information groups 1 to 3 to which the error detection code is added. The transmission processing unit 140 performs, for each information group, a transmission process by using methods having different channel tolerance. For example, the transmission processing unit 140 provides, to the information group 1, channel tolerance that matches with the worst channel state to be assumed. The transmission processing unit 140 provides, to the information group 3, channel tolerance that matches with the best channel state to be assumed over system design. The transmission processing unit 140 provides, to the information group 2, channel tolerance that matches with an intermediate channel state between the worst channel state and the best channel state.

In an example of Long Term Evolution (LTE), a modulation and coding scheme (MCS) according to a Channel Quality Indicator (CQI) indicating a channel state, has been prescribed. Table 1 shows an example of a CQI-MCS table in the LTE.

TABLE 1

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Here, CQI=1 is considered as an MCS corresponding to the worst channel state (that is, an MCS having the highest channel tolerance), and CQI=15 is considered as an MCS corresponding to the best channel state (that is, an MCS having the lowest channel tolerance). Therefore, it is presumed that the MCS of CQI=1 (QPSK, code rate=78/1024) is applied to the information group 1, the MCS of CQI=8 (16 QAM, code rate=490/1024), for example, is applied to the information group 2, and the MCS of CQI=15 (64 QAM, code rate=948/1024) is applied to the information group 3. In this case, regardless of the actual channel state, the reception device 200 can correctly receive one or more information groups. It is noted that the CQI is defined by a certain reception error rate (10% block error rate (BLER)) in the LTE; however, the description here is made conceptually for simplicity. Although details will be described later, according to the transmission method of Example 1, the gain of 6 dB can further be obtained during the demodulation process in addition to the effect of the channel tolerance by the MCS. As a result, the MCS corresponding to the worst channel state (MCS having the highest channel tolerance) may be CQI=3 and the like instead of CQI=1. Further, transmission capacity (the number of bits to be transmitted) differs for each CQI (MCS), and thus, grouping of the transmission information may be optimized according to the presumed CQI (MCS).

The error correction coding unit 130 applies an error correction code to each information group. In the above-described example, the error correction coding unit 130 performs, for the information group 1, error correction coding corresponding to CQI=1. The error correction coding unit 130 performs, for the information group 2, error correction coding corresponding to CQI=8. The error correction coding unit 130 performs, for the information group 3, error correction coding corresponding to CQI=15.

The bits of each information group to which the error detection code is added and the error correction coding is performed will be described as below.

Information group 1 (basic information group): a1, a2, a3, . . .

Information group 2 (supplementary information group): b1, b2, b3, . . .

Information group 3 (detailed supplementary information group): c1, c2, c3, . . .

It should be noted that although the codes same as those of the transmission information bits are used, the codes here represent the bits of each information group to which the error detection code is added and the error correction code is applied.

The transmission processing unit 140 performs, for each information group, a transmission process by using methods having different channel tolerance. In the above-described example, the transmission processing unit 140 provides, to the information group 1, channel tolerance equivalent to the modulation scheme (QPSK) corresponding to CQI=1. The transmission processing unit 140 provides, to the information group 2, channel tolerance equivalent to the modulation scheme (16 QAM) corresponding to CQI=8. The transmission processing unit 140 provides, to the information group 3, channel tolerance equivalent to the modulation scheme (64 QAM) corresponding to CQI=15.

Figure 3:
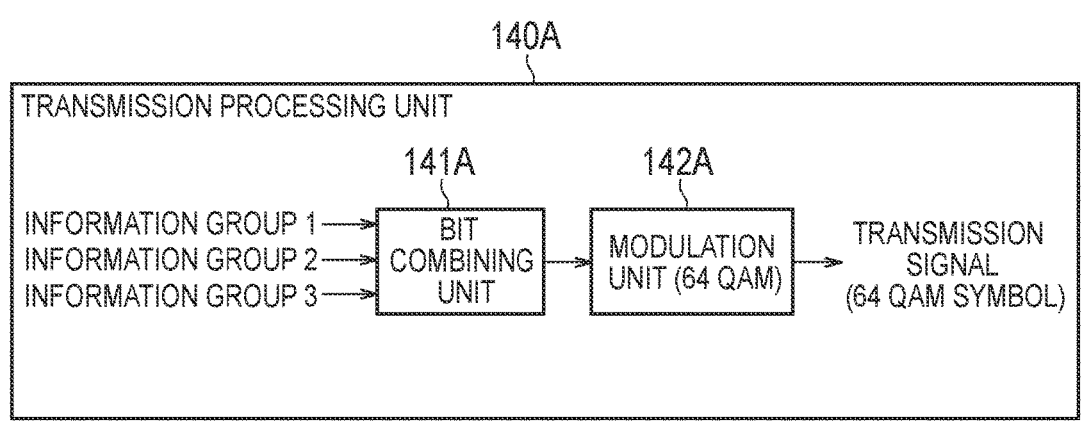
FIG. 3 is a diagram illustrating a configuration of a transmission processing unit according to Example 1.

FIG. 3 is a diagram illustrating a configuration of a transmission processing unit 140A according to Example 1. As illustrated in FIG. 3, the transmission processing unit 140A includes a bit combining unit 141A and a modulation unit 142A. The bit combining unit 141A generates a bit string including bits of each of the plurality of information groups (information groups 1 to 3). The modulation unit 142A uses a predetermined modulation scheme to map the bit string to a symbol. In this example, CQI=1, CQI=8, and CQI=15 are used to provide different channel tolerance, and thus, a modulation scheme for each is QPSK, 16 QAM, and 64 QAM. To apply the modulation scheme corresponding to each of the groups, 64 QAM is selected as the predetermined modulation scheme of the modulation unit 142A. As a result, it is possible to achieve the multiplexing of three types of modulation schemes, QPSK, 16 QAM, and 64 QAM, the details of which will be described later. The bit combining unit 141A arranges, in the bit string, a position of bits of each of the plurality of information groups to a predetermined bit position to arrange a plurality of consecutive symbols to signal points placed adjacent on an IQ plane.

Specifically, the bit combining unit 141A combines bits of the above-described three information groups as described below.

$$\{(a_{2i+1}, b_{8i+1}, c_{32i+1}, a_{2i+2}, b_{8i+2}, c_{32i+2}), (a_{2i+1}, b_{8i+1}, c_{32i+3}, a_{2i+2}, b_{8i+2}, c_{32i+4}), (a_{2i+1}, b_{8i+1}, c_{32i+5}, a_{2i+2}, b_{8i+2}, c_{32i+6}), (a_{2i+1}, b_{8i+1}, c_{32i+7}, a_{2i+2}, b_{8i+2}, c_{32i+8})\}, i=0,1,2, \ldots \text{ (the same shall apply hereinafter)} \quad (1)$$

$$\{(a_{2i+1}, b_{8i+3}, c_{32i+9}, a_{2i+2}, b_{8i+4}, c_{8i+10}), (a_{2i+1}, b_{8i+3}, c_{32i+11}, a_{2i+2}, b_{8i+4}, c_{32i+12}), (a_{2i+1}, b_{8i+3}, c_{32i+13}, a_{2i+2}, b_{8i+4}, c_{32i+14}), (a_{2i+1}, b_{8i+3}, c_{32i+15}, a_{2i+2}, b_{8i+4}, c_{32i+16})\}, \quad (2)$$

$$\{(a_{2i+1}, b_{8i+5}, c_{32i+17}, a_{2i+2}, b_{8i+6}, c_{32i+18}), (a_{2i+1}, b_{8i+5}, c_{32i+19}, a_{2i+2}, b_{8i+6}, c_{32i+20}), (a_{2i+1}, b_{8i+5}, c_{32i+21}, a_{2i+2}, b_{8i+6}, c_{32i+22}), (a_{2i+1}, b_{8i+5}, c_{32i+23}, a_{2i+2}, b_{8i+6}, c_{32i+24})\}, \quad (3)$$

$$\{(a_{2i+1}, b_{8i+7}, c_{32i+25}, a_{2i+2}, b_{8i+8}, c_{32i+26}), (a_{2i+1}, b_{8i+7}, c_{32i+27}, a_{2i+2}, b_{8i+8}, c_{32i+28}), (a_{2i+1}, b_{8i+7}, c_{32i+29}, a_{2i+2}, b_{8i+8}, c_{32i+30}), (a_{2i+1}, b_{8i+7}, c_{32i+31}, a_{2i+2}, b_{8i+8}, c_{32i+32})\}, \quad (4)$$

The bit combining unit 141A outputs each bit string indicated by a parenthesis to the modulation unit 142A. Specifically, the bit combination unit 141A outputs the bit string to the modulation unit 142A in the order of: four parentheses in (1), four parentheses in (2), four parentheses in (3), and four parentheses in (4). 6-bit binary data is included in the round parenthesis. That is, the data corresponds to the 64 QAM modulation. The modulation unit 142A maps each bit string to a symbol by 64 QAM and outputs a transmission signal (64 QAM symbol).

A total of 16 parentheses are included in (1), (2), (3), and (4). The first bit and the fourth bit in the 16 parentheses are the same bit in the information group 1, that is, $a_{2i+1}$, $a_{2i+2}$.

Further, the second bit and the fifth bit in each parenthesis in (1), (2), (3), and (4) are the same bits in the information group 2, that is:

the second bit and the fifth bit in four parentheses in (1) are $b_{8i+1}$, $b_{8i+2}$ in the information group 2;

the second bit and the fifth bit in four parentheses in (2) are $b_{8i+3}$, $b_{8i+4}$ in the information group 2;

the second bit and the fifth bit in four parenthesis in (3) are $b_{8i+5}$, $b_{8i+6}$ in the information group 2; and the second bit and the fifth bit in four parenthesis in (4) are $b_{8i+7}$, $b_{8i+8}$ in the information group 2.

Further, the third bit and the sixth bit in the parentheses in (1), (2), (3), and (4) are different bits in the information group 3.

Figure 4:
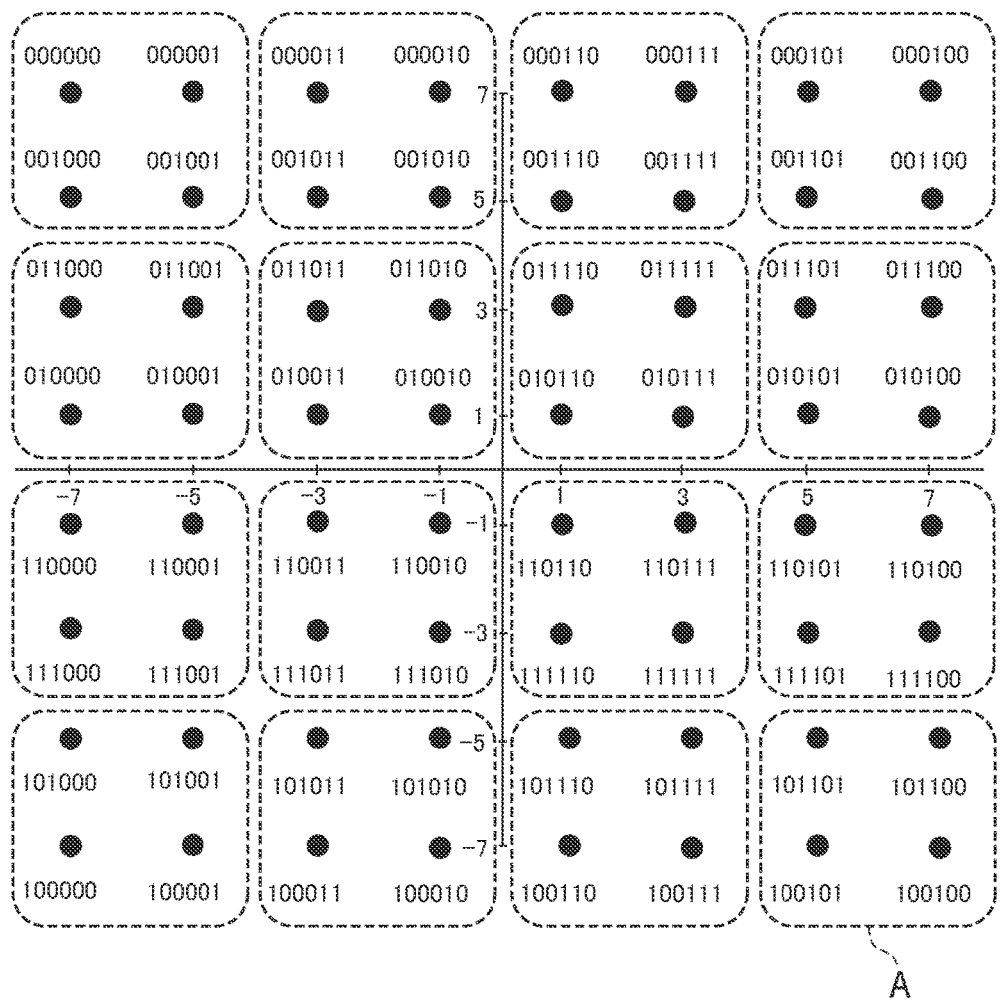
FIG. 4 is a diagram illustrating a 64 QAM constellation according to Example 1.

FIG. 4 is a diagram illustrating a 64 QAM constellation. On an IQ plane illustrated in FIG. 4, each of a first quadrant to a fourth quadrant includes 16 signal points. In the 16 signal points included in one quadrant, the values of the first bit are the same, and the values of the fourth bit are the same. For example, in the 16 signal points included in the first quadrant, the values of the first bit are all "0" and the values of the fourth bit are all "1". Further, the 16 signal points included in one quadrant can be divided into four signal point groups formed of four signal points. In FIG. 4, each signal point group is indicated by a dashed line. In four signal points included in the signal point group, the values of the second bit are the same and the values of the fifth bit are the same. For example, in the four signal points included in a signal point group A of FIG. 4, the values of the second bit are all "0" and the values of the fifth bit are all "0".

Thus, in a total of 16 parentheses in (1), (2), (3), and (4), setting the first bits to have the same value and the fourth bits to have the same value allows the 16 parentheses, that is, the 16 consecutive symbols to be arranged in an identical quadrant. Further, in the parentheses in each of (1), (2), (3), and (4), setting the second bits to have the same value and the fifth bits to have the same value allows four parentheses in each of (1), (2), (3), and (4), that is, four consecutive symbols to be arranged in an identical signal point group. In this manner, the bit combining unit 141A arranges, in the bit string indicated by the parenthesis, a position of bits of each of the plurality of information groups to a predetermined bit position to arrange the plurality of consecutive symbols to the signal points placed adjacent on the IQ plane. It is noted that in a bit string of six bits, the first bit and the fourth bit are bits in the information group 1, the second bit and the fifth bit are bits in the information group 2, and the third bit and the sixth bit are bits in the information group 3.

The transmission signal (64 QAM symbol) output by the modulation unit 142A is converted into an RF signal by the RF unit 150 and transmitted to the reception device 200. In the reception device 200, the RF unit 220 converts the received RF signal into a baseband signal (reception signal) and outputs the reception signal (64 QAM symbol) to the reception processing unit 230. The reception processing unit 230 performs a reception process of the reception signal (64 QAM symbol). The reception processing unit 230 composes a plurality of consecutive symbols into one composite symbol and uses a modulation scheme different from the predetermined modulation scheme (64 QAM) to demodulate the composite symbol.

Figure 5:
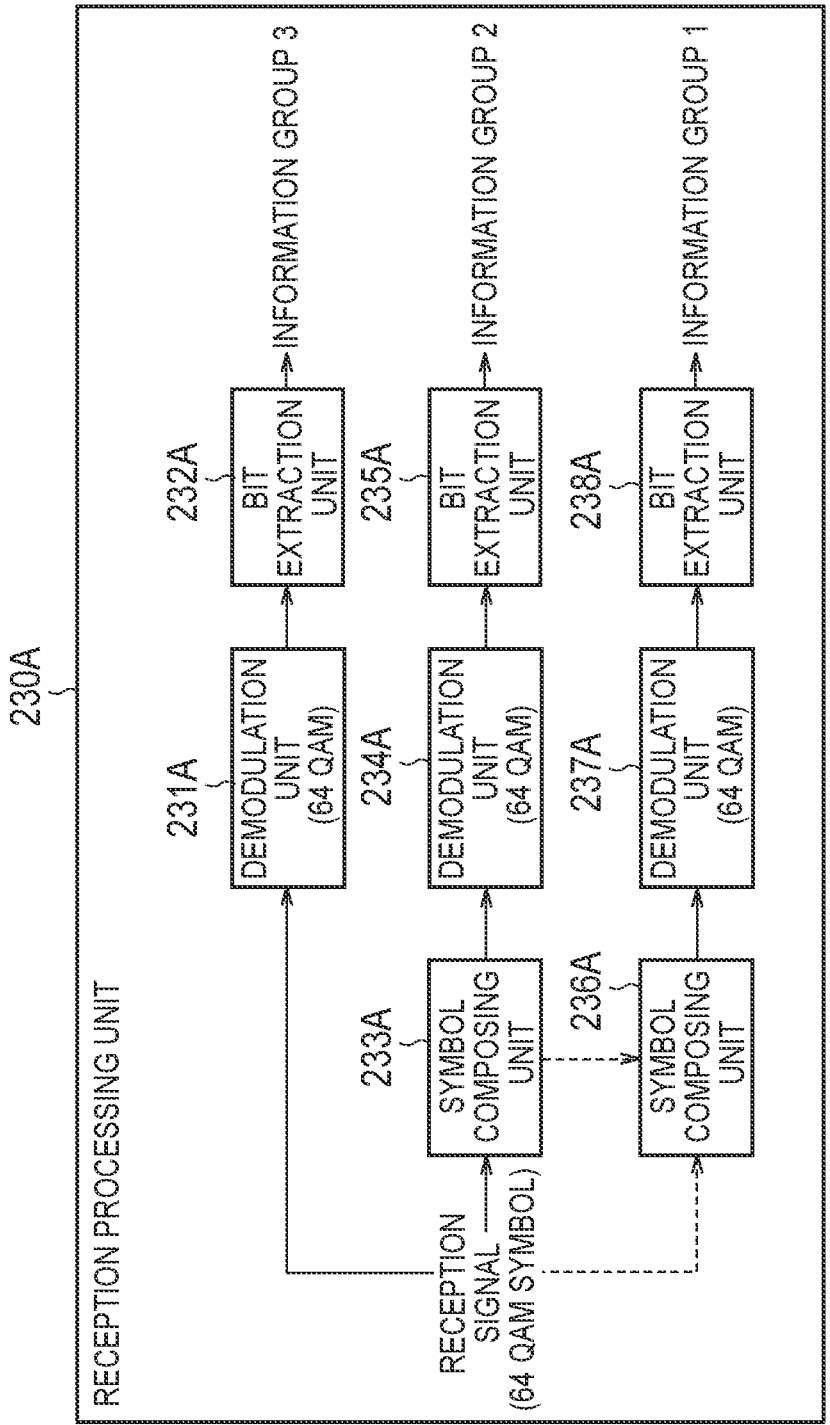
FIG. 5 is a diagram illustrating a configuration of a reception processing unit according to Example 1.

FIG. 5 is a diagram illustrating a configuration of a reception processing unit 230A according to Example 1. As illustrated in FIG. 5, the reception processing unit 230A includes a demodulation unit 231A, a bit extraction unit 232A, a symbol composing unit 233A, a demodulation unit 234A, a bit extraction unit 235A, a symbol composing unit 236A, a demodulation unit 237A, and a bit extraction unit 238A.

The demodulation unit 231A and the bit extraction unit 232A are used for a reception process of the information group 3. The demodulation unit 231A demodulates the received 64 QAM symbol as 64 QAM. The bit extraction unit 232A extracts and outputs the third bit and the sixth bit from the demodulated six bits. These third and sixth bits are bits in the information group 3. That is, the information group 3 is transmitted and received by 64 QAM. However, among six bits, the bits in the information group 3 are only two bits, and the remaining four bits are bits in the information groups 1 and 2 (that is, multiplexing modulation transmission). Under a condition where the information group 3 can be correctly received, the information groups 1 and 2 can also be correctly received.

Figure 6:
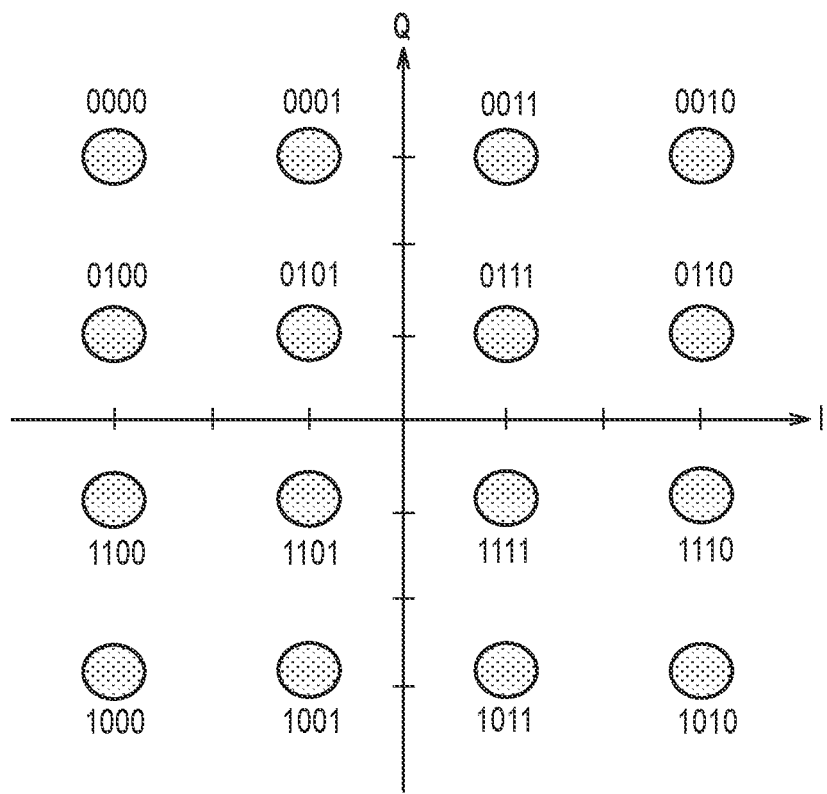
FIG. 6 is a diagram illustrating a 16 QAM constellation according to Example 1.

Further, the symbol composing unit 233A, the demodulation unit 234A, and the bit extraction unit 235A are used for a reception process of the information group 2. The symbol composing unit 233A adds up four consecutively received 64 QAM symbols, and outputs a composite symbol. The demodulation unit 234A demodulates the composite symbol in accordance with a 16 QAM constellation illustrated in FIG. 6. The second bit and the fifth bit (bits in the information group 2) in (1), (2), (3), and (4) correspond to the second bit and the fourth bit of signal points illustrated in FIG. 6. Specifically, two bits in the information group 3 (the third bit and the sixth bit) are cleared by performing composite operation on the four consecutive symbols. In the remaining four bits, the first bit is a bit in the information group 1 (originally the first bit), the second bit is a bit in the information group 2 (originally the second bit), the third bit is a bit in the information group 1 (originally the fourth bit), and the fourth bit is a bit in the information group 2 (originally the fifth bit). Therefore, the second bit and the fourth bit in FIG. 6 correspond to the second bit and the fifth bit in any of (1), (2), (3), and (4). The bit extraction unit 235A extracts the second bit and the fourth bit (originally the second bit and the fifth bit) from the demodulated four bits. Among four bits, the bits in the information group 2 are only two bits, and the remaining two bits are bits in the information group 1 (that is, multiplexing modulation transmission). In this manner, the information group 2 adds up the four consecutively received 64 QAM symbols and demodulates the symbols as 16 QAM, and thus, not only it is possible to have a transmission performance as 16 QAM but also to obtain the gain of approximately 6 dB by composing the four 64 QAM symbols.

Figure 7:
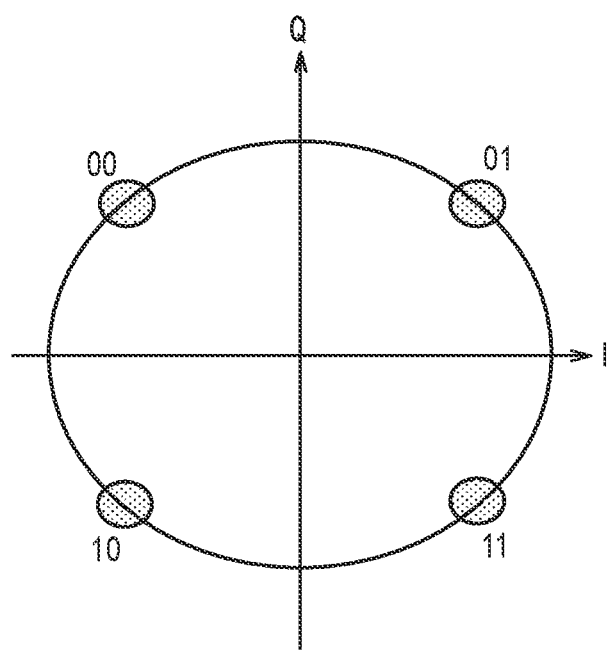
FIG. 7 is a diagram illustrating a QPSK constellation according to Example 1.

Further, the symbol composing unit 236A, the demodulation unit 237A, and the bit extraction unit 238A are used for a reception process of the information group 1. The symbol composing unit 236A adds up 16 consecutively received 64 QAM symbols, and outputs a composite symbol. Alternatively, the symbol composing unit 236A may further add up four consecutive composite symbols (equivalent to sixteen 64 QAM symbols) output by the symbol composing unit 233A and output a composite symbol. The demodulation unit 237A demodulates the composite symbol in accordance with the QPSK constellation illustrated in FIG. 7. As described above, 16 consecutive 64 QAM symbols are arranged in the identical quadrant in FIG. 4, and correspond to two bits in the information group 1 (the first bit and the fourth bit in (1), (2), (3), and (4)). Thus, the bits in the information group 1 can be obtained by composing the 16 consecutively received 64 QAM symbols and demodulating as the QPSK. It is noted that the bit arrangement in FIG. 7 is associated with FIG. 4. The first bit and the fourth bit in the same quadrant in FIG. 4 are the same, and the first bit and the fourth bit in the first to fourth quadrants in FIG. 4 are 01, 00, 10, 11, and thus, similarly in FIG. 7, the first to fourth quadrants have 01, 00, 10, 11. The reception of the information group 1 is a result of the composition of 16 consecutive symbols, and thus, a composite gain can be obtained in addition to the QPSK performance. The composite gain is 6 dB compared to a symbol in which four symbols are composed, and is 12 dB compared to the original 64 QAM symbol.

In this manner, the reception processing unit 230A outputs the information groups 1 to 3 to the error correction decoding unit 240. The error correction decoding unit 240 performs error correction decoding for the information groups 1 to 3. Next, the error detection unit 250 performs error detection for the information groups 1 to 3. For example, if the error detection code is a parity check sum, a parity (even/odd of the sum of all bits including the error detection coding bit) is simply checked. If the error is not detected in the information group, the error detection unit 250 outputs the information group to the group composing unit 260 and if the error is detected in the information group, the error detection unit 250 discards the information group. It is noted that since an MCS assuming the worst channel state is applied, it can be expected that the information group 1 is correctly received. From this perspective, it is not always necessary to add an error detection code to the information group 1.

If two or more information groups are correctly received, the group composing unit 260 composes the correctly received information groups. The group composing unit 260 may pad the information groups that have not been correctly received with "0" (or "1"). If only the information group 1 is correctly received, the received $h_{11}$ is (a1, a2, a3, 0, 0, 0, 0, 0, 0, 0, 0, 0, 0, 0). Further, if the information group 1 and the information group 2 are correctly received, the received $h_{11}$ is (a1, a2, a3, b1, b2, b3, b4, b5, 0, 0, 0, 0, 0). Further, if all of the three information groups are correctly received, the received $h_{11}$ is (a1, a2, a3, b1, b2, b3, b4, b5, c1, c2, c3, c4, c5, c6). It should be noted that although the same codes a1, a2, a3, ..., b1, b2, b3, ..., c1, c2, c3, ... are used, the codes here represent the information bits of each information group to which the error correction decoding is performed and the error detection is performed.

It is noted that in the method of Example 1, the 16 consecutive 64 QAM symbols are in the same quadrant and the four consecutive 64 QAM symbols are arranged around the signal points corresponding to the 16 QAM constellation. Therefore, to add up the correct four consecutive 64 QAM symbols (or 16 consecutive 64 QAM symbols) on the reception side, the transmission side and the reception side need to be synchronized. Synchronization is the basis of the digital communication, and thus, a premise is set that a necessary synchronization has already been established.

Further, in the method of Example 1, reception rates are different between MCSs. For example, information of the information group 3 can be received for each symbol, while information of the information group 2 is received after composing four symbols, and thus, the information group 2 is delayed compared to the information group 3. The information group 1 is further delayed. Thus, it is necessary to consider this difference in symbol rate when considering (designing) the symbol rate. For example, designing in accordance with the symbol rate of the information group 1 is considered.

Example 2

Example 2 will be described while focusing on a difference from the Example 1, below. In Example 2, the grouping, the addition of error detection code, and the error correction coding for the transmission information are the same as in Example 1. However, in Example 2, not only a case where the error correction coding having different performance is used, but also a case of the error correction coding having the same performance may be applied, by using the below-described method to provide different channel tolerance. The bits of each group to which an error detection code is added and an error correction code is applied will be described as below.

Information group 1 (basic information group): A=a1, a2, a3, ...

Information group 2 (supplementary information group): B=b1, b2, b3, ...

Information group 3 (detailed supplementary information group): C=c1, c2, c3, ...

Figure 8:
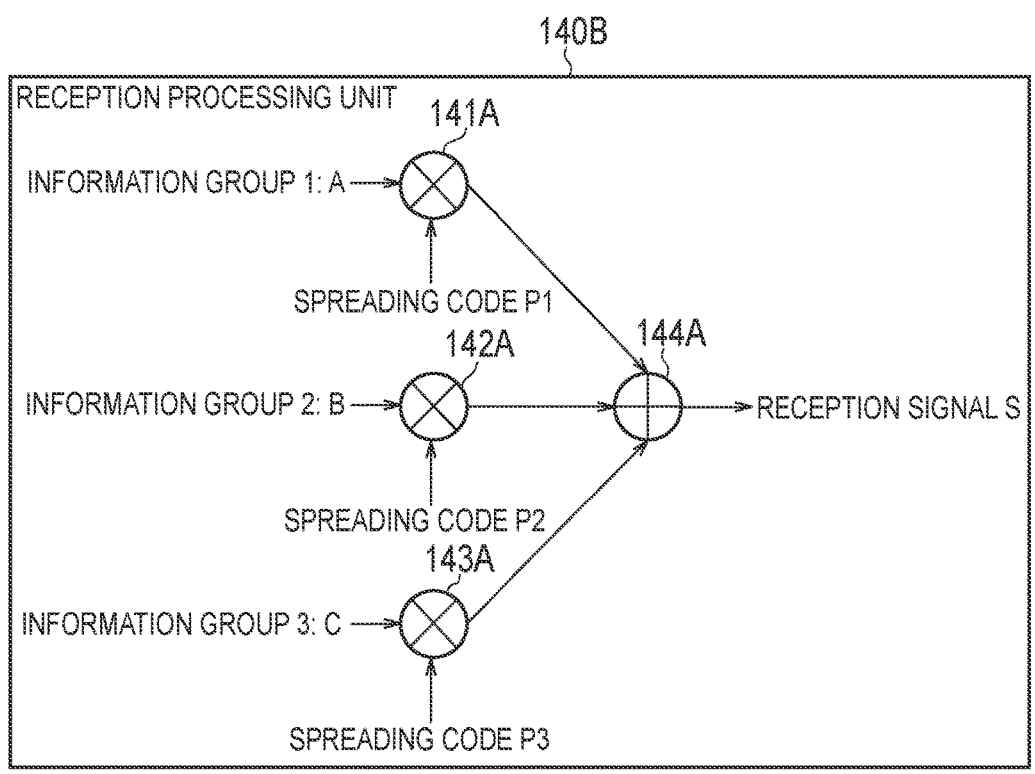
FIG. 8 is a diagram illustrating a configuration of a transmission processing unit according to Example 2.

FIG. 8 is a diagram illustrating a configuration of a transmission processing unit 140B according to Example 2. The transmission processing unit 140B according to Example 2 applies a spreading code (orthogonal code) of the chip rate different depending on each of the information groups to perform a spreading process. As the spreading code, codes such as a PN code, a Gold code, a Hadamard code, and the like can be utilized. As illustrated in FIG. 8, the transmission processing unit 140B includes spreading units 141A to 143A, and a composing unit 144A. The spreading units 141A to 143A spread the information groups 1 to 3 by using spreading codes P1 to P3. The spreading codes P1 to P3 have different chip rates. The ratio between the chip rate (1/Tc: where Tc is a time length of a single "1" or "0" of the spreading codes) and data rate of the information (1/Td: where Td is a time length of one information bit) is called "processing gain", and is used as one of the indices for channel tolerance. Under a condition where the data rate is constant, the higher the chip rate is, the higher the processing gain is and the higher the channel tolerance is. In the spreading codes P1 to P3, the chip rate of P1 is the highest, and the chip rate of P3 is the lowest. The composing unit 144A adds up the information groups 1 to 3 spread by the spreading codes P1 to P3 and outputs as a transmission signal S. The spreading process by the transmission processing unit 140B can be represented as follows.

$$S = A*P1 + B*P2 + C*P3$$

It is noted that the spreading code chip rate of the information group 1 may be calculated from the processing gain (channel tolerance) which can correspond to the worst channel state assumed over the system design. On the other hand, the spreading code chip rate of the information group 3 may be calculated from the processing gain (channel tolerance) corresponding to the best channel state assumed over the system design. Further, the spreading code chip rate of the information group 2 may be calculated from the processing gain (channel tolerance) corresponding to the channel state in which the information group 2 can be received.

Figure 9:
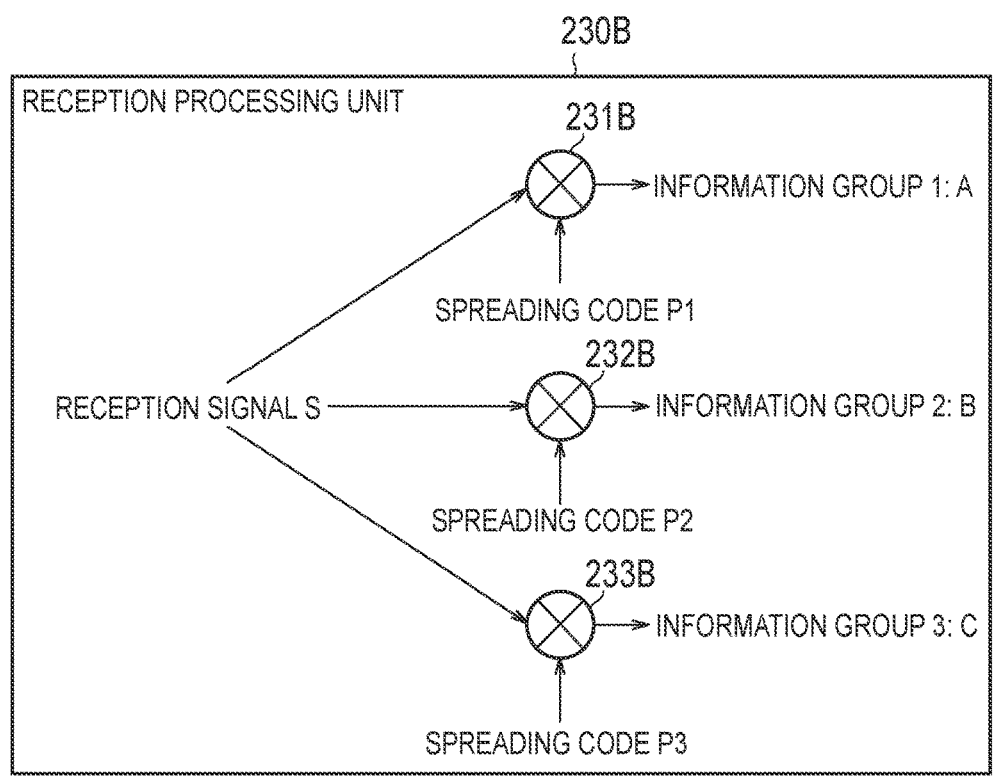
FIG. 9 is a diagram illustrating a configuration of a reception processing unit according to Example 2.

In Example 2, the reception device 200 performs a reverse spreading. FIG. 9 is a diagram illustrating a configuration of a reception processing unit 230B according to Example 2. The reception processing unit 230B applies spreading codes different depending on each of the information groups to perform a reverse spreading process. As illustrated in FIG. 9, the reception processing unit 230B includes reverse spreading units 231B to 233B. The reverse spreading units 231B to 233B reverse spreads a reception signal S by using the spreading codes P1 to P3 and outputs the information groups 1 to 3. The reverse spreading process by the reception processing unit 230B can be represented as follows.

$$A = \Sigma S^*P1$$

$$B = \Sigma S^*P2$$

$$C = \Sigma S^*P3$$

Where a range of $\Sigma$ is a bit length of the transmission information (that is, Td). Then, the reception device 200 performs the error correction, the error detection, and the group composing process by using methods similar to that in Example 1.

In this manner, according to Example 2, different channel tolerance is achieved by using orthogonal codes (spreading codes) having different chip rates. The orthogonal codes (spreading codes) have been already well-studied and well-practiced, and have a wide variation in both type and number. From this point of view, Example 2 has higher flexibility compared to Example 1. Further, it is easily achieved even in a case where the transmission information needs to be divided into more information groups.

Example 3

Example 3 will be described while focusing on differences from Examples 1 and 2, below. In Examples 1 and 2, an identical time-frequency resource is used to transmit and receive the plurality of information groups. On the other hand, Example 3 is an Example where different time-frequency resources are used to transmit and receive the plurality of information groups.

Figure 10:
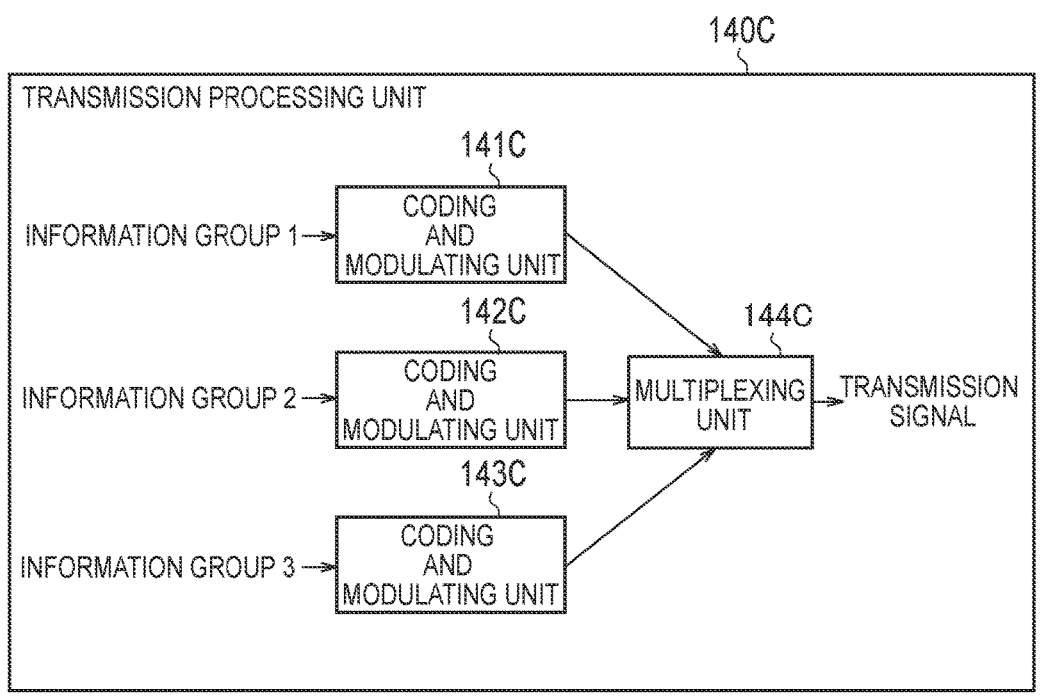
FIG. 10 is a diagram illustrating a configuration of a transmission processing unit according to Example 3.

FIG. 10 is a diagram illustrating a configuration of a transmission processing unit 140C according to Example 3. In Example 3, the transmission processing unit 140C is integrated with the error correction coding unit 130. The transmission processing unit 140C performs at least one of a modulation process of applying modulation schemes different depending on each of the information groups and a coding process of applying error correction coding schemes different depending on each of the information group.

As illustrated in FIG. 10, the transmission processing unit 140C includes coding and modulating units 141C to 143C and a multiplexing unit 144C. The coding and modulating units 141C to 143C perform error correction coding and modulation of the information groups 1 to 3. The coding and modulating unit 141C uses the MCS corresponding to the worst channel state assumed over the system design to perform the error correction coding and the modulation of the information group 1. The coding and modulating unit 142C uses the MCS corresponding to a receivable channel state assumed over the system design to perform the error correction coding and the modulation of the information group 2. The coding and modulating unit 143C uses the MCS corresponding to the best channel state assumed over the system design to perform the error correction coding and the modulation of the information group 3. Although the MCS is differed for each information group, only the modulation scheme may be differed while the coding scheme (the error correction scheme and the coding rate) is made common. Only the coding scheme may be differed while the modulation scheme is made common.

The multiplexing unit 144C multiplexes the information groups 1 to 3 by a frequency division multiplexing (FDM) or a time division multiplexing (TDM) and outputs a transmission signal. In a case of the FDM, the multiplexing unit 144C transmits the information group 1 at a frequency f1, transmits the information group 2 at a frequency f2, and transmits the information group 3 at a frequency f3. The bandwidth of each frequency may be equally configured. The bandwidth of each frequency may be adjusted in accordance with system design ideas and requests. In a case of the TDM, the multiplexing unit 144C transmits the information group 1 in a time slot t1, transmits the information group 2 in a time slot t2, and transmits the information group 3 in a time slot t3. The time length of each time slot may be equally configured. The time length of each time slot may be adjusted in accordance with the system design ideas and requests.

Figure 11:
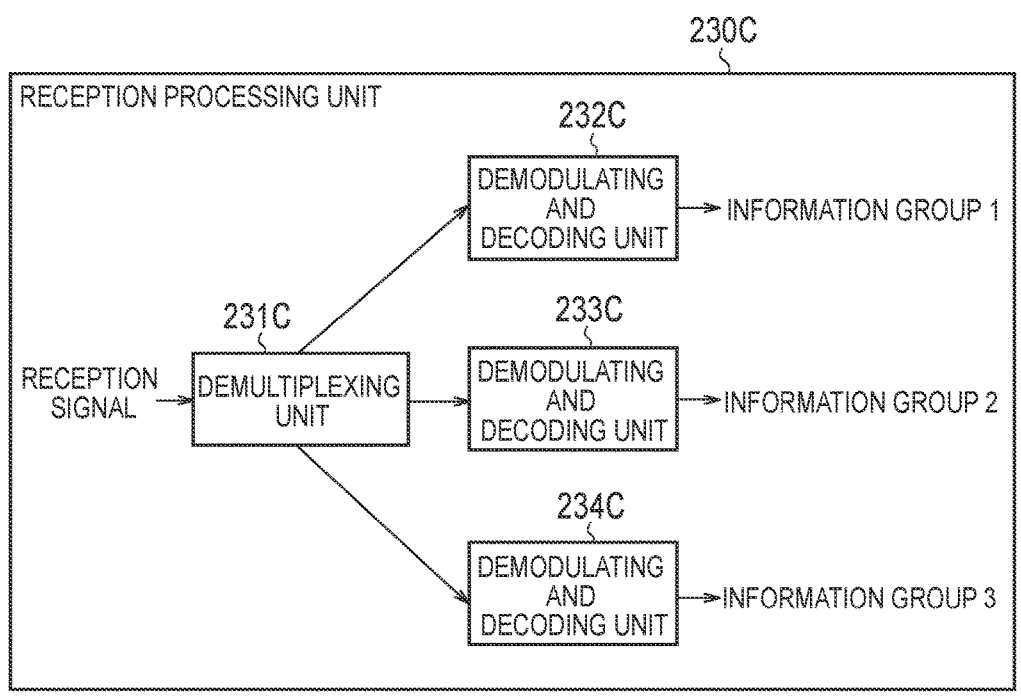
FIG. 11 is a diagram illustrating a configuration of a reception processing unit according to Example 3.

FIG. 11 is a diagram illustrating a configuration of a reception processing unit 230C according to Example 3. In Example 3, the reception processing unit 230C is integrated with the error correction decoding unit 240. The reception processing unit 230C performs at least one of a demodulation process of applying modulation schemes different depending on each of the information groups and a decoding process of applying coding schemes different depending on each of the information groups.

As illustrated in FIG. 11, the reception processing unit 230C includes a demultiplexing unit 231C and demodulating and decoding units 232C to 234C. The demultiplexing unit 231C demultiplexes the information groups 1 to 3 that have been multiplexed by the FDM or the TDM and outputs the information groups 1 to 3. The demodulating and decoding units 232C to 234C perform demodulation and error correction decoding of the information groups 1 to 3. The demodulating and decoding unit 232C uses the MCS corresponding to the coding and modulating unit 141C on the transmission side to perform the demodulation and the error correction decoding of the information group 1. The demodulating and decoding unit 233C uses the MCS corresponding to the coding and modulating unit 142C on the transmission side to perform the demodulation and the error correction decoding of the information group 2. The demodulating and decoding unit 234C uses the MCS corresponding to the coding and modulating unit 143C on the transmission side to perform the demodulation and the error correction decoding of the information group 3. Here, although the MCS is differed for each information group, only the modulation scheme may be differed while the coding scheme (the error correction scheme and the coding rate) is made common, or only the coding scheme may be differed while the modulation scheme is made common.

MODIFICATION

While embodiments and Examples have been described above, it should not be understood that those descriptions and drawings constituting a part of the present disclosure limit the present invention. From this disclosure, a variety of alternate embodiments, Examples, and applicable techniques will become apparent to one skilled in the art.

First Modification

The reception device 200 can grasp, based on an error detection result of the error detection unit 250, which information group has been correctly received, and thus, the actual channel state can be estimated. If the reception device 200 also performs transmission to the transmission device 100, the reception device 200 may optimize the transmission of the transmission device 100 based on the estimated channel state. For example, if the transmission device 100 is a radio terminal and the reception device 200 is a base station, an example is assumed where the radio terminal transmits downlink Channel State Information (CSI) to the base station as transmission information. In this case, the base station estimates an uplink channel state based on the reception state of the CSI and adaptively controls the transmission of the radio terminal based on the estimation result. For example, the base station adjusts a grouping method (the number of groups and the number of bits of each group) and a transmission method having different channel tolerance (for example, the MCS, the chip rate of spreading code, and the like), and notifies the radio terminal of the adjustment. Specifically, if it is determined that the channel state is good, the base station performs adjustments such as using the MCS of one level above, or increasing the information amount (the number of bits) of the basic information group, and notifies the radio terminal of the adjustment.

Second Modification

The reception device 200 can grasp, based on the error detection result of the error detection unit 250, which information group has been correctly received, and thus, the accuracy of the received information can be grasped. If the reception device 200 also performs transmission to the transmission device 100, the reception device 200 may optimize the transmission to the transmission device 100 based on the accuracy of the grasped reception information. For example, if the transmission device 100 is a radio terminal and the reception device 200 is a base station, an example is assumed where the radio terminal transmits downlink Channel State Information (CSI) to the base station as transmission information. In this case, the base station estimates the CSI accuracy based on the reception state of the CSI (error detection result) and adaptively controls the transmission of the radio terminal based on the estimation result. For example, the base station adjusts beamforming and MIMO control. Specifically, if only the CSI having low accuracy (basic group) can be received, the base station performs adjustments such as transmitting by using beam forming having a wide beam width or not performing the MIMO. On the other hand, if the CSI having high accuracy (up to detailed supplementary information group) can be received, the base station performs adjustments such as transmitting by using beam forming having a sharp beam width or actively performing the MIMO.

Third Modification

The reception device 200 may request the transmission device 100 to retransmit the information group that has not been correctly received, based on the error detection result of the error detection unit 250. After receiving a retransmission request of the information group from the reception device 200, the transmission device 100 retransmits the information group to the reception device 200.

Fourth Modification

In the above-described embodiments and Examples, an example has been described where the present invention is applied to the radio transmission system. Specifically, the transmission information has been transmitted from the transmission device 100 to the reception device 200 via the radio channel. However, the present invention may be applied to a wired transmission system. If the present invention is applied to the wired transmission system, the transmission information may be transmitted from the transmission device 100 to the reception device 200 via a wired channel.

INDUSTRIAL APPLICABILITY

The present invention is useful in the field of radio communication.

The invention claimed is:

1. A transmission device configured to transmit transmission information to a reception device via a communication channel, comprising:
    a grouping unit configured to divide the transmission information into a plurality of information groups;
    an error detection code adding unit configured to add an error detection code to the plurality of information groups; and
    a transmission processing unit configured to perform a process of transmitting the plurality of information groups to the reception device, wherein
    the transmission processing unit performs, for each information group included in the plurality of information groups, a transmission process by using methods having different error tolerance on the communication channel.

2. The transmission device according to claim 1, wherein the transmission processing unit is configured to perform a process of transmitting the plurality of information groups to the reception device irrespective of a measurement result of a channel state of the communication channel.

3. The transmission device according to claim 1, wherein the plurality of information groups include a basic information group and a supplementary information group, and
    the transmission processing unit is configured to perform a process of transmitting the basic information group by using a transmission method having higher channel tolerance compared to a transmission method applied to the supplementary information group.

4. The transmission device according to claim 1, wherein the transmission processing unit is configured to generate, by a predetermined arrangement method, a bit string including bits of each of the plurality of information groups and uses a predetermined modulation scheme to map the bit string to a symbol.

5. The transmission device according to claim 4, wherein the transmission processing unit is configured to arrange, in the bit string, a position of the bits of each of the plurality of information groups to a predetermined bit position to arrange a plurality of consecutive symbols to signal points placed adjacent on an IQ plane.

6. The transmission device according to claim 1, wherein the transmission processing unit is configured to apply a spreading code of a chip rate different depending on each of the information groups to perform a spreading process.

7. The transmission device according to claim 1, wherein the transmission processing unit is configured to perform at least one of a modulation process of applying a modulation scheme different depending on each of the information groups and a coding process of applying an error correction coding scheme different depending on each of the information groups.

8. A reception device configured to receive transmission information from a transmission device via a communication channel, comprising:
 a reception processing unit configured to perform a reception process of a plurality of information groups transmitted from the transmission device by using methods having different error tolerance on the communication channel;
 an error detection unit configured to use an error detection code included in the plurality of information groups to determine a correctly received information group among the plurality of information groups; and
 a group composing unit configured to perform a composing process of the correctly received information group.

9. The reception device according to claim 8, wherein the plurality of information groups include a basic information group and a supplementary information group, and the basic information group is transmitted, from the transmission device, by using a method having higher channel tolerance compared to a transmission method applied to the supplementary information group.

10. The reception device according to claim 8, wherein the reception processing unit is configured to perform a process of receiving a symbol obtained by mapping a bit string including bits of each of the plurality of information groups by using a predetermined modulation scheme.

11. The reception device according to claim 10, wherein the reception processing unit is configured to compose a plurality of consecutive symbols into one composite symbol, and uses a modulation scheme different from the predetermined modulation scheme to demodulate the composite symbol.

12. The reception device according to claim 8, wherein the reception processing unit is configured to apply a spreading code of a chip rate different depending on each of the information groups to perform a reverse spreading process.

13. The reception device according to claim 8, wherein the reception processing unit is configured to perform at least one of a demodulation process of applying a modulation scheme different depending on each of the information groups and a decoding process of applying an error correction coding scheme different depending on each of the information groups.

* * * * *